Inventors
Michael D. Harter
Benedict Macfarlane
Vern W. Weekman, Jr.
By James F. Powers Jr.
Attorney 3,707,463
FCC CATALYST SECTION CONTROL
Michael D. Harter, Cranbury, and Benedict MacFarlane and Vern W. Weekman, Jr., Cherry Hill, N.J., assignors to Mobil Oil Corporation
Filed Dec. 7, 1970, Ser. No. 95,641
Int. Cl. C10g 13/18
U.S. Cl. 208—164
9 Claims

ABSTRACT OF THE DISCLOSURE

The specific disclosure provides for controlling a catalyst section of a fluid catalytic cracking system by adjusting the flow rate of an oxygen-containing gas to a regenerator in response to deviation of the regenerator dense bed temperature from a predetermined dense bed temperature, and by adjusting the predetermined regenerator dense bed temperature in response to deviation of the reactor temperature from a predetermined reactor temperature. Further, the regenerated catalyst flow rate is adjusted in response to deviation of a measured temperature difference between the regenerator dense bed and the regenerator flue gas from a predetermined regenerator dense bed and regenerator flue gas temperature difference. Alternatively, the regenerated catalyst flow rate is adjusted in response to deviation of a measured amount of oxygen in the regenerator flue gas from a predetermined amount of oxygen in the regenerator flue gas.

BACKGROUND OF THE INVENTION

Field of the invention

This invention relates to an improved method and apparatus for controlling a fluid catalytic cracking system. More specifically, the present invention relates to a method and an apparatus for providing rapid and stable reactor and regenerator responses to disturbances.

DESCRIPTION OF THE PRIOR ART

Fluid catalytic cracking has been known and commercially employed for many years. In general, a fluid catalytic cracking system comprises a catalyst section wherein a reactor inlet line is charged with fresh feed which is usually preheated and at least one recycle stream. The charge stream picks up regenerated catalyst from a regenerated catalyst line or standpipe, and is passed into the reactor. Within the reactor, the catalyst is maintained in a dense phase which, with respect to its physical properties, acts much like a liquid. Products are removed from the reactor in the vapor phase and passed to a products recovery section comprising at least one main fractionator or distillation column for separation into desired products. Catalyst, which has been coked by the cracking reaction in the reactor, is continuously passed from the reactor by a spent catalyst transfer line to a regenerator. In the regenerator, the coke is burnt from the catalyst by contact with an oxygen-containing gas. Flue gas is passed from the regenerator, and the regenerated catalyst is recirculated to the reactor by the standpipe where it is picked up by the reactor charge stream. Typical fluid catalyst cracking systems are disclosed in U.S. Pat. Nos. 3,206,393 and 3,261,777.

The quantity of oxygen-containing gas for regeneration is an important control variable in that an excess of oxygen causes "afterburning" of carbon monoxide in the dilute phase of the regenerator which causes high temperatures. On the other hand, an insufficient amount of oxygen provides inadequate removal of the carbon from the catalyst and thus introduces a limiting feature to the entire fluid catalytic cracking process.

Automatic means for controlling a fluid catalytic cracking process are steadily gaining acceptance as a result of the capacity of computers to solve many of the control problems encountered in the processes. One form of automatic control of a fluid catalytic cracking process is to provide a digital computer programmed with a model of the overall process, and to feed the digital computer with input variables which are measured within the fluid catalytic cracking process. Computations as defined by the model are then made in response to the measured input variables to provide control signals for adjusting the set points of conventional analog controllers. With such a control system, the underlying primary analog loops should adequately regulate to compensate for disturbances such as temperature changes in the feed stock, reactor and regenerator, and changes in charge stock coking tendency. Thus, stability and rapid response capabilities are important in the primary analog loops such as those used in the catalyst section. The catalyst section comprises the regenerator and the reactor and should be provided with good regulation to prevent disturbances from being passed on to other portions of the fluid catalytic cracking system.

H. Kurihara in Optimal Control of Fluid Catalytic Cracking Process, Ph. D. Thesis, MIT, 1967, proposed a control system for a catalyst section wherein the temperature differential between the regenerator flue gas and the regenerator dense bed is controlled by regulating the flow of regenerator catalyst being circulated to the reactor. The system also calls for controlling dense bed regenerator temperature by adjustment of the air flow rate to the regenerator.

The Kurihara system emphasizes the control of the regenerator over that of thhe reactor on the premises that the overall dynamics of the catalystic section of a fluid catalytic cracking system are dominated by the regenerator which is generally larger than the reactor, and that the limiting variables for the safety of the regenerator are the regenerator temperature and the oxygen concentration at the outlet of the regenerator bed. The regenerator and the reactor are dynamically coupled through the common variables of catalyst temperature and flow, and coke on catalyst. Thus, this scheme permits the reactor temperature to float under disturbances to maintain the energy balance of the system.

However, in commercial operations it is often desirable to maintain the reactor temperature reasonably constant to prevent introduction of large disturbances in temperature and composition to the main fractionating column.

SUMMARY OF THE INVENTION

In accordance with the present invention, there is provided a method for controlling the operation of a reactor and a regenerator of a fluid catalytic cracking system wherein a measured temperature of the reactor is compared to a predetermined reactor temperature, and the flow rate of an oxygen-containing gas supplied to the regenerator is adjusted in response to a function of this comparison in a direction to restore the reactor temperature to the predetermined regenerator dense bed temperature. The method further provides for comparing a representation of the amount of oxygen in the upper portion of the regenerator with a predetermined representation of an amount of oxygen, and adjusting the flow rate of regenerated catalyst between the regenerator and the reactor in a direction to restore the representation of the amount of oxygen in the upper portion of the regenerator to the predetermined representation of an amount of oxygen.

In accordance with another aspect of the present invention, there is provided a system for controlling the catalyst section of a fluid catalytic cracking system comprising means for comparing a measured reactor temperature with a predetermined reactor temperature to generate a reactor temperature deviation, and means responsive to a function of the reactor temperature deviation for controlling the flow rate of oxygen-containing gas supplied to the regenerator in a direction to reduce the reactor temperature deviation. The system also includes means for comparing a representation of the amount of oxygen in the upper portion of the regenerator with a predetermined representation of the amount of oxygen in the upper portion of the regenerator to provide a regenerator oxygen deviation, and means for controlling the flow rate of the regenerated catalyst to the reactor in a direction to reduce the oxygen deviation.

Thus, the present invention provides for the reactor and the regenerator to share disturbance caused excursions in the reactor and/or regenerator temperatures.

DESCRIPTION OF SPECIFIC EMBODIMENTS

Figure 1:
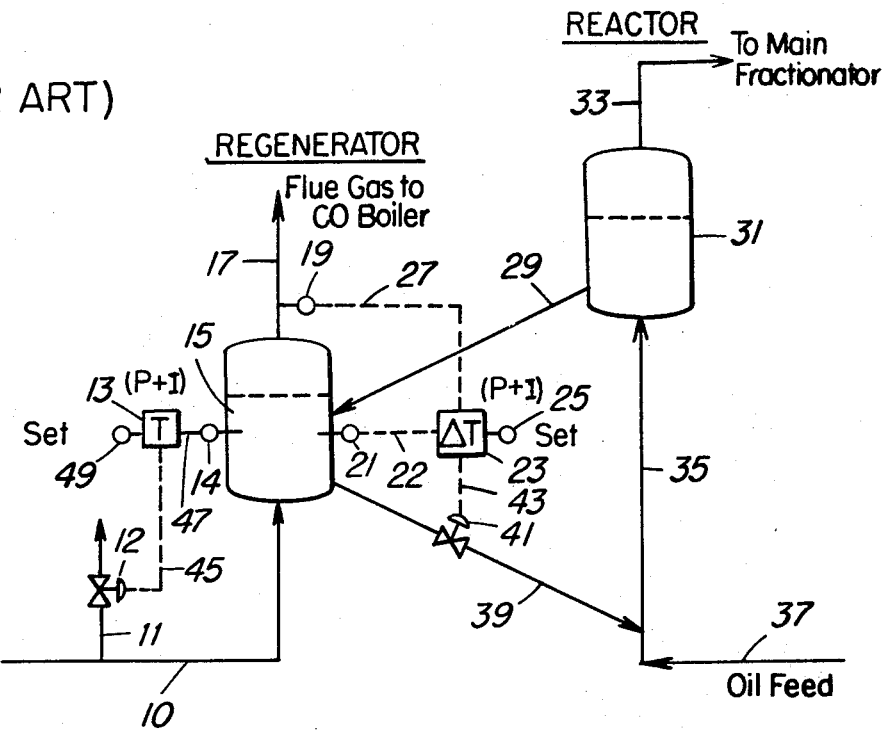
FIG. 1 is a schematic representation of a prior art catalyst section control system.

FIG. 1 shows the essentials of the catalyst section control system disclosed in the MIT thesis by H. Kurihara discussed above. With reference to FIG. 1, an oxygen-containing gas such as air is supplied by a conduit 10 to the lower portion of a generator 15 for burning coke from spent catalyst supplied to the regenerator 15. A conduit 17 is connected to the top of the regenerator 15 for venting the regenerator flue gas, or for feeding the flue gas to a carbon monoxide boiler (not shown) where the carbon monoxide is converted to carbon dioxide. A regenerated catalyst line or standpipe 39 extends from the lower portion of the regenerator to a reactor feed conduit 35. An oil feed conduit 37, which typically includes a preheated fresh feed and at least one recycle stream, supplies a feed stock stream to the reactor feed line 35 where the charge picks up the regenerated catalyst from the standpipe 39. The charge and regenerated catalyst is then passed into the reactor 31 at the lower end thereof. Products in a vapor phase (above the dashed line) are removed from the reactor 31 at the upper end thereof by a conduit 33 and passed to a product recovery section which includes at least one fractionator, and a stream of spent or coked catalyst is continuously passed from the reactor 31 to the regenerator 15 by a spent catalyst transfer line 29.

A temperature controller 13 has an adjustable set point control 49 which adjusts the temperature controller 13 to a predetermined set point. A thermo-couple 14 or other temperature indicating means senses the temperature in the regenerator dense phase or bed (below the dashed line) and applies a signal representative of the sensed dense phase or bed temperature along a line 47 to the temperature controller 13. The temperature controller 13 compares the sensed dense phase or bed temperature applied thereto by line 47 which a set point or predetermined dense bed or phase temperature as determined by the setting of the set point control 49, and generates a signal representative of the dense phase or bed temperature error along a line 45 to adjust a control valve 12 in a vent line 11 to thereby adjust the vent rate of an oxygen-containing gas from the line 10.

The adjustment of the vent rate of the oxygen-containing gas in line 10 is in a direction to decrease the regenerator dense phase or bed temperature error signal. For example, if the temperature sensed by the thermo-couple 14 is below the predetermined temperature of the set point control 49, the vent rate through line 11 is decreased to thereby supply an increase of oxygen-containing gas through line 10 to the regenerator 15. Conversely, if the temperature sensed by the thermo-couple 14 is higher than the predetermined temperature as defined by the set point control 49, the error signal along line 45 will adjust the valve 12 to permit an increase in the vent rate through line 11, and thus decrease the amount of oxygen-containing gas supplied to the regenerator 15 by way of the line 10.

A thermo-couple 19 or other temperature indicating means senses the temperature of the flue gas in the line 17, and applies a signal representative thereof along a line 27 to one input of a differential temperature controller 23. Another thermo-couple 21 or other temperature indicating means senses the temperature in the dense phase or bed of the regenerator 15, and applies a signal representative thereof along a line 22 to the other input of the differential temperature controller 23. The differential temperature controller 23 has a set point control means 25 for adjusting the differential temperature controller 23 to a predetermined temperature differential representative of a difference in temperature between the flue gas and the regenerator dense phase or bed. The differential temperature controller 23 determines the difference in temperature signals applied thereto by lines 27 and 22 and compares the actual measured differential temperature with the predetermined differential temperature as determined by the set point control 25, and generates a differential temperature error signal along line 43 to a control valve in the regenerated catalyst line or standpipe 39 to thereby adjust the regenerated catalyst flow rate in the line 39 in a direction which tends to decrease the differential error signal generated by the differential temperature controller 23. An increase in the regenerated catalyst flow rate in the standpipe 39 acts to decrease the amount of oxygen in the upper portion of the regenerator 15 available for "afterburning" of carbon monoxide by increasing the rate of coke available in the dense phase for combination with the oxygen. Thus, an increase in the catalyst flow rate in the standpipe 39 causes a decrease in the measured differential temperature between the flue gas and the dense bed. Conversely, a decrease in the flow rate of the regenerated catalyst acts to increase the measured differential temperature between the dense bed and the flue gas by providing an excess of oxygen in the upper portion of the regenerator which causes "afterburning" of carbon monoxide.

Thus, the system of FIG. 1 emphasizes the control of the regenerator portion of the catalyst section to maintain the energy balance of the system and thereby permits the reactor temperature to change as a result of disturbances to the system. However, it is often preferable to maintain the reactor temperature reasonably constant to avoid introduction of disturbances to the main fractionating column.

Figure 2:
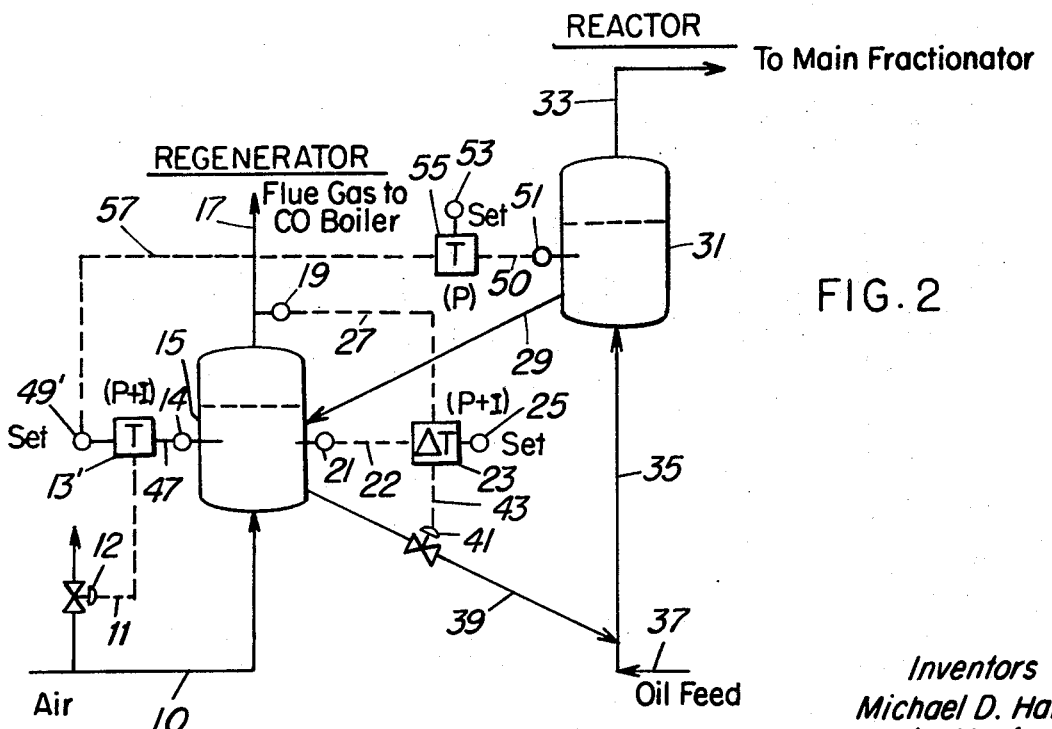
FIG. 2 is a schematic representation of a catalyst section control system in accordance with the present invention.

FIG. 2 discloses an analog embodiment of the present invention which provides for rapid and stable reactor and regenerator regulation against disturbances, and minimizing the possibility of passing disturbances to the main fractionating column. The FIG. 2 embodiment is an improvement of the system shown in FIG. 1. The elements of FIG. 2 which are identical to those of FIG. 1 are identified by the same reference numerals used in FIG. 1.

The analog system of FIG. 2 provides a specific embodiment for adjusting the flow rate of the oxygen-containing gas in the line 10 in response to a function of a deviation of a reactor temperature from a predetermined reactor temperature by a cascade loop in combination with a temperature controller 13'. The cascade loop adjusts the set point of the temperature controller 13' in response to deviations of the reactor temperature from a predetermined temperature set point. The cascade loop comprises a thermo-couple 51 or other temperature indicating means which measures a temperature of the reactor 31 and applies a signal along a line 52 to a temperature controller 55. The temperature controller 55 has a set point control means 53 for setting the temperature controller 55 to a predetermined reactor temperature value. The temperature controller 55 compares the signal on line 52 representative of the actual reactor temperature to the predetermined reactor temperature as defined by the set point control 53, and generates a reactor temperature error signal along a line 57 representative of the difference between the measured reactor temperature and the predetermined reactor temperature.

The reactor temperature error signal on line 57 acts to change the predetermined temperature of the regenerator dense phase or bed by adjusting the set point control 49' of the temperature controller 13' in a direction which tends to reduce the reactor temperature error signal. Specifically, if the reactor error signal on line 57 indicates a high reactor temperature, the predetermined temperature or set point of the temperature controller 13' is lowered. Thus, the regenerator temperature error signal applied by the line 45 to the valve 12 in the oxygen-containing gas vent line 11 will indicate a high regenerator temperature and thus act to further open the valve 12 and increase the vent flow rate in the line 11. As a result, the flow rate of oxygen-containing gas to the regenerator will be decreased to thereby decrease the regenerator temperature to reduce the regenerator temperature error signal on line 45. As a result of the lower regenerator temperature, the temperature of the regenerated catalyst in the line 39 is reduced which, in turn, reduces the amount of heat applied to the reactor 31 by the regenerated catalyst, and thus lowers the temperature of the reactor 31.

Conversely, a reactor temperature error signal on line 57 indicative of a low reactor temperature will act to increase the predetermined temperature or set point of the regenerator temperature controller 13', which, in turn, will cause a regenerator temperature error signal on line 45 indicative of a low regenerator temperature. A low regenerator temperature error signal acts to control the valve 12 to reduce the amount of oxygen-containing gas that is vented through the line 11 and, thus increases the amount of oxygen-containing gas supplied by the line 10 to the regenerator. Consequently, the temperature of the regenerated catalyst in the standpipe 39 increases, and the heat applied to the reactor 31 by the regenerated catalyst increases to thereby increase the reactor 31 temperature.

Adjustment of the gain of the cascade loop for adjusting the regenerator temperature set point 49' in response to deviations of the reactor temperature from a set point 53 permits disturbance effects to be apportioned between the reactor 31 and the regenerator 15 such that the deviation swings may be absorbed in either the reactor 31 or the regenerator 15, or shared in any proportion between the reactor 31 and the regenerator 15.

The gain of the cascade loop determines the magnitude of adjustment of the regenerator temperature set point 49' in response to a deviation of the reactor temperature from the set point 53. For example, if the value of the gain is zero, then the regenerator temperature set point 49' is not adjusted at all, regardless of the deviations of the reactor temperature from the set point 53. If the gain value is 10, then a one degree Fahrenheit deviation of the reactor temperature from the set point 53 will adjust the regenerator temperature set point 49' by 10° F.

The regenerator differential temperature controller 23 acts in the same manner as described above with reference to FIG. 1 in that signals representative of a temperature of the regenerator flue gas and of a temperature of the regenerator dense bed are applied by lines 27, 22, respectively, as inputs to the differential temperature controller 23 where the measured regenerator differential temperature is compared with a predetermined regenerator differential temperature as defined by the set point control 25. The differential temperature controller 23 generates a differential temperature error signal on line 43 which adjusts the valve 41 to vary the regenerated catalyst flow rate in the standpipe 39 in a direction to reduce the differential temperature error signal.

The regenerator differential temperature is representative of the excess amount of oxygen supplied to the regenerator 15. The amount of oxygen in the flue gas line 17 is also representative of the excess amount of oxygen supplied to the regenerator 15. Accordingly, the differential temperature controller 23 may be replaced by an oxygen analyzer, such as manufactured by Mine Safety Appliances Co., Pittsburgh, Pa., arranged to monitor the amount of oxygen in the flue gas line 17 and to provide a signal to a controller having an adjustable set point. In this embodiment, the controller generates a flue gas oxygen level error signal for adjusting the valve 41 in a direction to reduce the flue gas oxygen level error signal.

Figure 3:
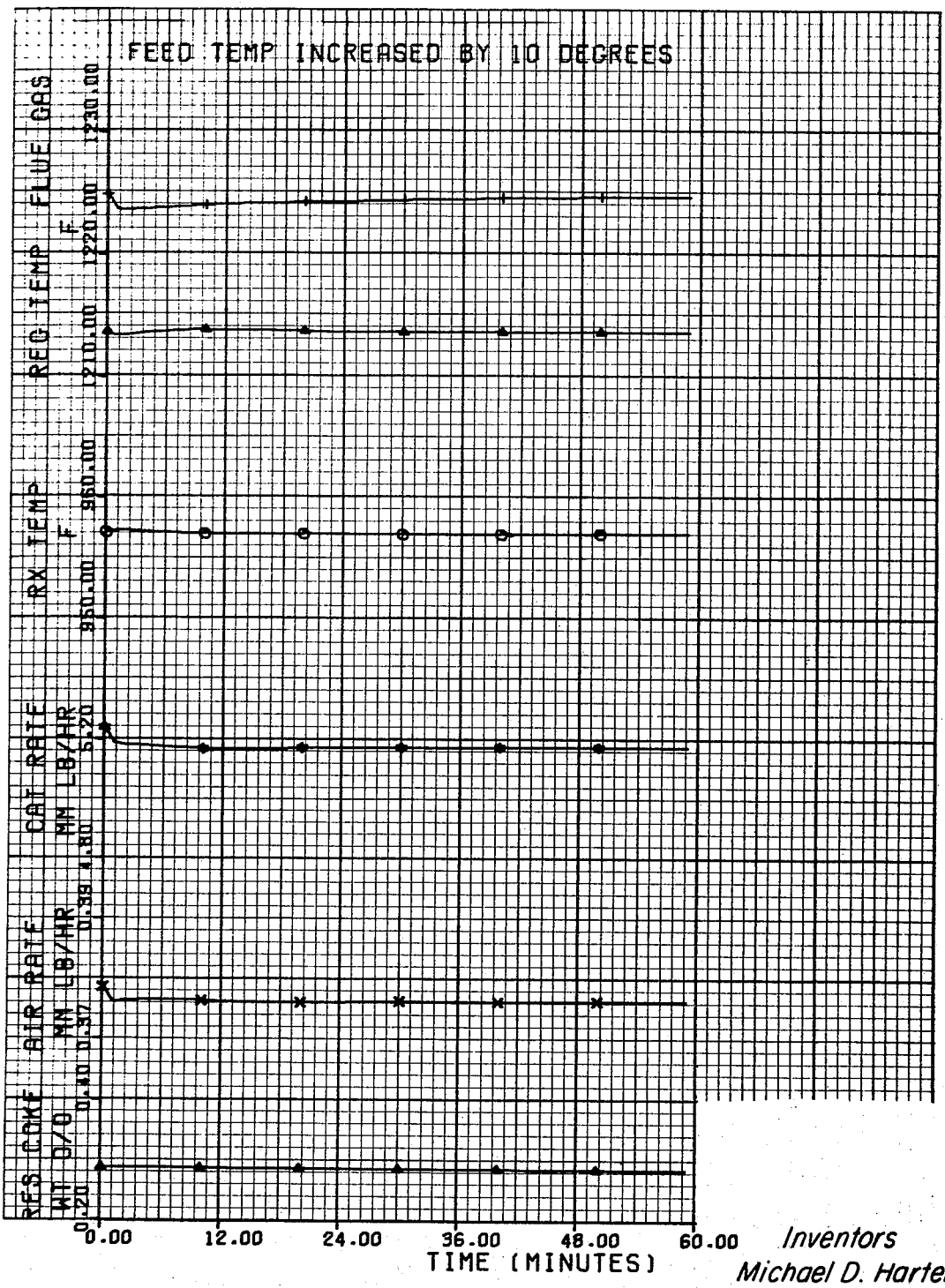
FIGS. 3–6 are graphs of data generated by manipulation of a mathematical model.
Figure 4:
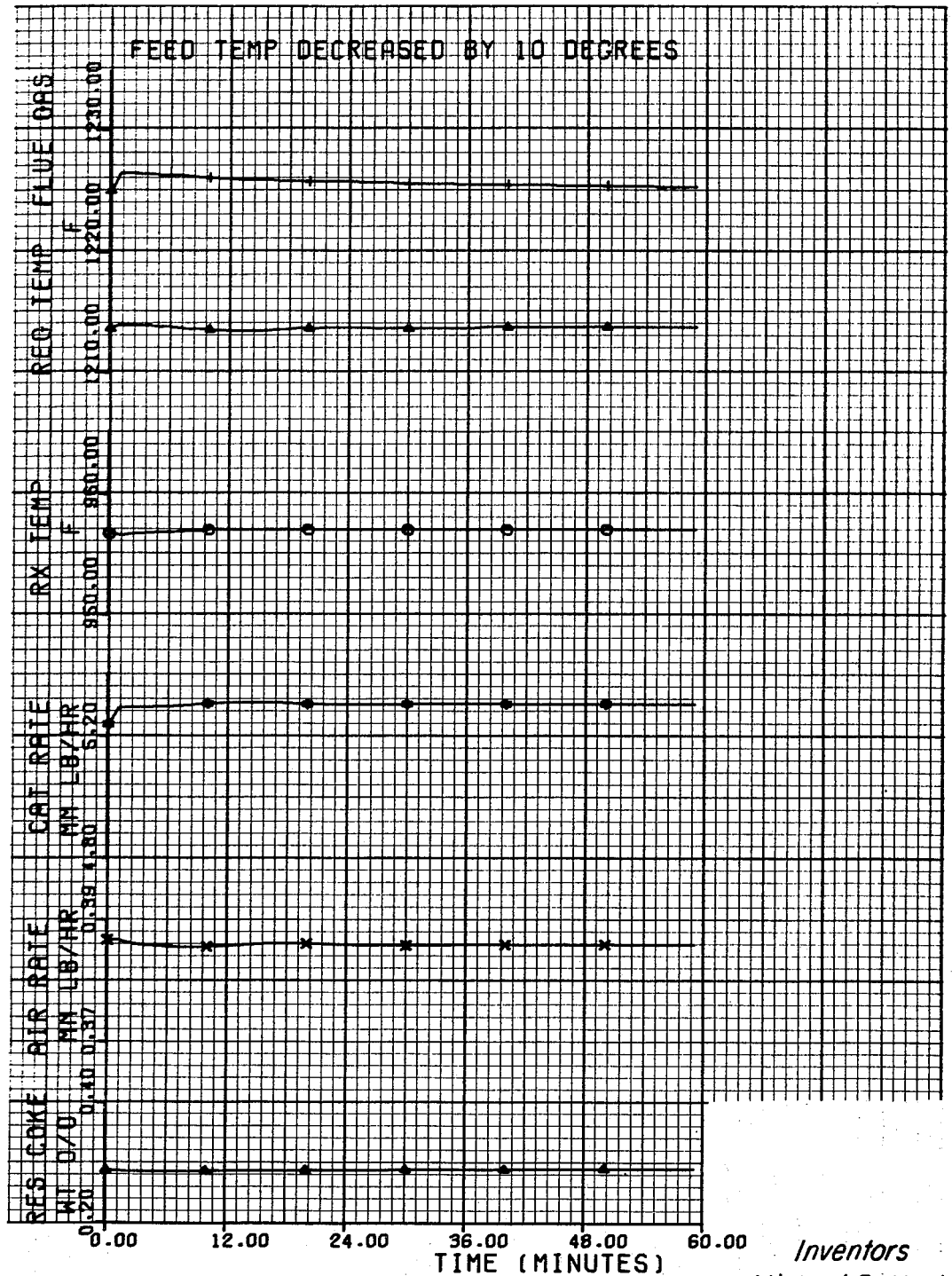

A mathematical model of a fluid catalytic cracking system control as shown in FIG. 2 was prepared and implemented using digital simulation techniques. The results of the simulation are shown in the computer printouts of FIGS. 3-6, and demonstrate a rapid and stable response to normal disturbances. FIG. 3 provides a printout from the model showing the flue gas temperature, the regenerator dense bed temperature, the reactor temperature (RX TEMP), the catalyst flow rate, the oxygen-containing gas or air flow rate to the regenerator, and the residual coke changes in response to a positive step change in feed temperature of +10° F. Similarly, FIG. 4 shows a computer printout of the same variables shown in FIG. 3 in response to a negative step change in feed temperature of −10° F. Each of FIGS. 3 and 4 demonstrate that the system settled to a new steady operation within the matter of a very few minutes.

Figure 5:
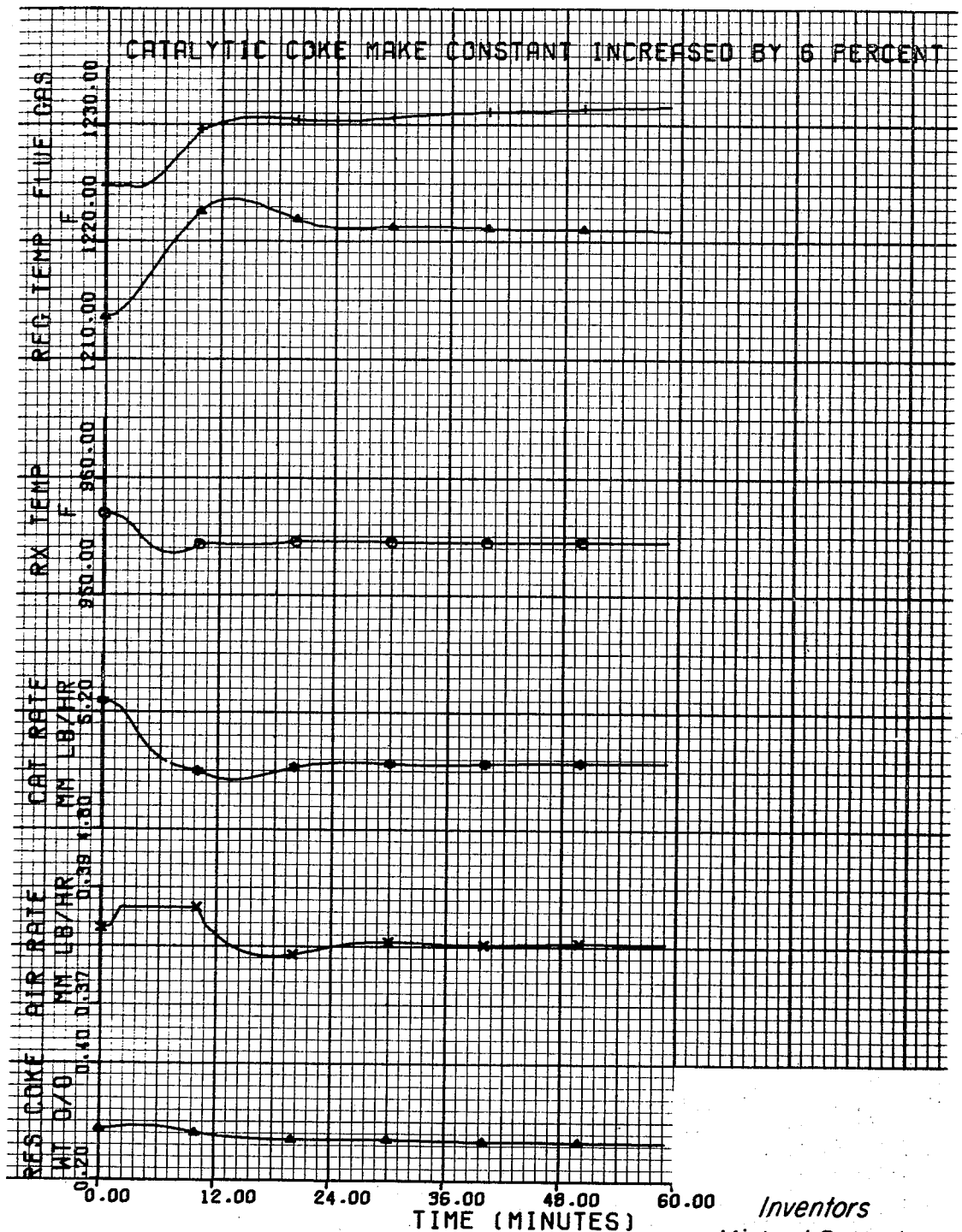
Figure 6:
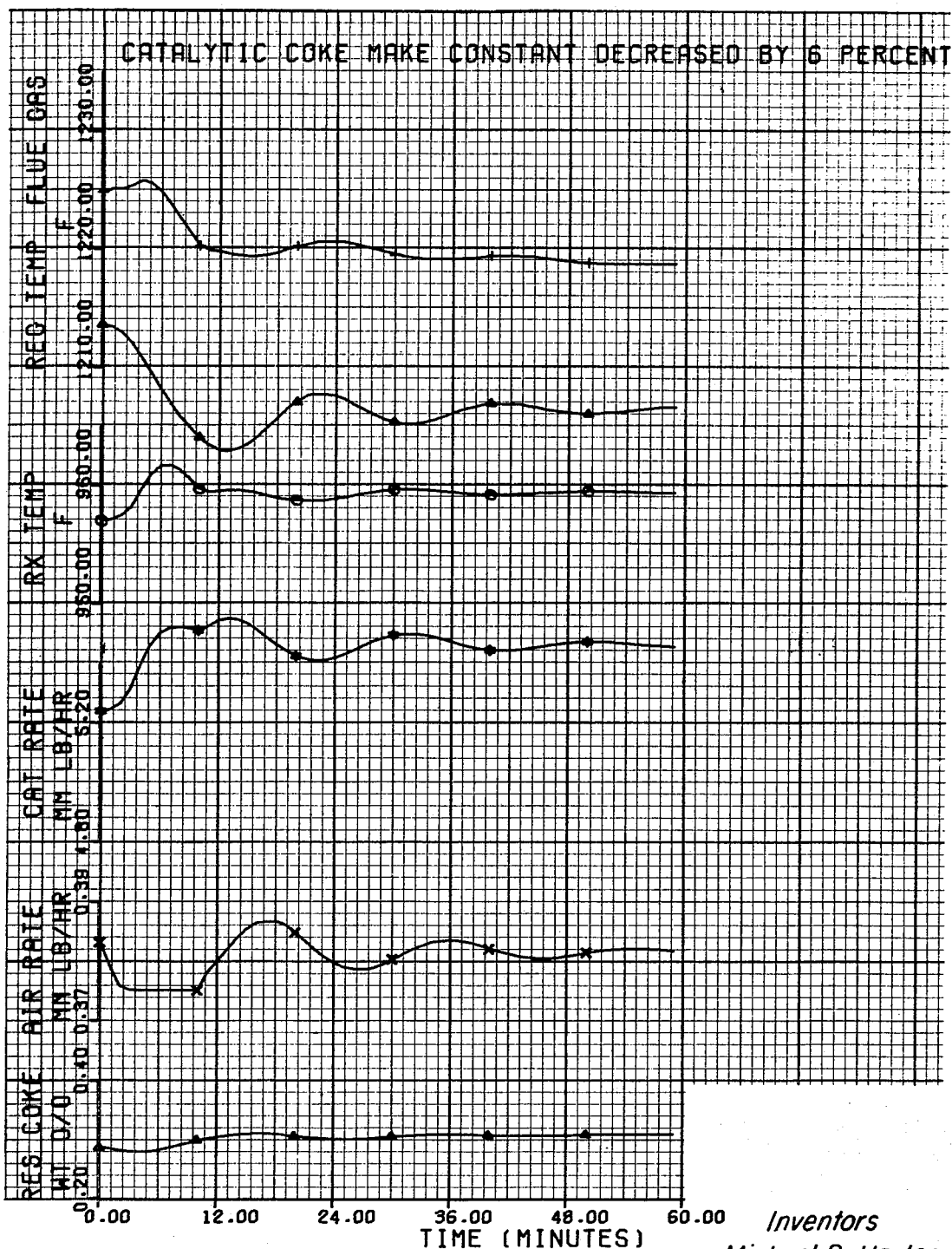

FIGS. 5 and 6 show a computer printout of the model in response to a step increase of 6% in the catalytic coke make constant and a step decrease in the catalytic coke make constant of 6%, respectively. Each of FIGS. 5 and 6 show that the considered variables were at a reasonable steady state operation within 48 minutes.

Thus, there has been described an analog system suitable for controlling the catalyst section of a fluid catalytic cracking process such that the reactor and regenerator rapidly respond to disturbances to settle at stable operation in a short period of time.

The set point controls 49', 53, and 25 of FIG. 2 may be manually adjustable to provide a predetermined level of operation, or may be adjusted in response to output control signals from a digital computer.

The invention also contemplates a purely digital computer control embodiment in which the temperature readings provided by the thermo-couples 14, 19, 21 and 51 or other temperature indicating means are fed to a computer which is programmed to generate the set points 49', 25 and 53. The temperature indicated by the output of the thermo-couple 14 is compared to a predetermined regenerator dense bed temperature or set point generated within the computer, and the computer generates an output signal to control the valve 12 in the vent line 11. Further, the computer compares the output signal from the thermo-couple 51 to a predetermined reactor temperature or set point, and if there is a difference the computer acts to adjust the computer generated predetermined regenerators dense bed temperature or set point in a direction to compensate for the reactor temperature error. Still further, the computer is programmed to compare the regenerator temperature differential of the outputs from the thermo-couples 19 and 21 with a computer generated regenerator predetermined temperature differential or set point, and to generate an error signal to control the valve 41 in the regenerated catalyst line 39 in a direction to compensate for the difference in the regenerator temperature differential from the computer generated predetermined temperature differential or set point. Alternatively, the valve 41 may be adjusted in response to a computer generated flue gas oxygen level error signal computed by comparing a signal from a flue gas oxygen analyzer with a computer generated predetermined flue gas oxygen level signal.

The method and apparatus of the present invention is suitable for application in any fluid catalytic cracking system comprising a reactor and a regenerator forming a catalyst section such as that shown in U.S. Pat. No. 3,206,393, which patent is incorporated herein by reference. A typical catalyst section normally includes a level controller responsive to the dense phase bed level in the reactor for controlling a slide valve in the spent catalyst transfer line. Catalyst sections also normally include a differential pressure regulator responsive to a differential pressure between the upper portion of the reactor and the upper portion of the regenerator for controlling a control valve to regulate the regenerator flue gas flow rate to maintain a predetermined pressure difference between the reactor and the regenerator. A level controller and a differential pressure regulator for carrying out these functions are shown in U.S. Pat. No. 3,206,393.

Suitable controllers for carrying out the functions described with reference to FIGS. 1 and 2 are well known in the art. The letters in parentheses near each of the controllers of FIGS. 1 and 2 indicate a type of suitable controller. P+I represents a proportional and integral controller, and P represents a proportional controller.

Figure 7:
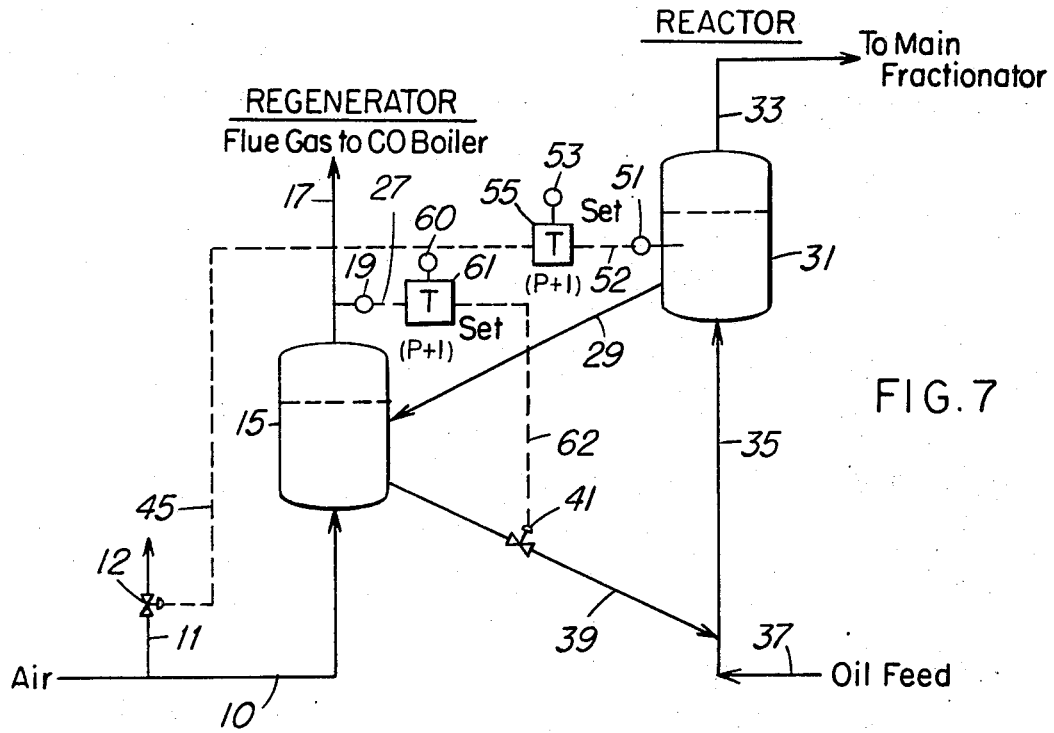
FIGS. 7 and 8 are schematic representations of catalyst section control systems disclosed in U.S. patent application Ser. Nos. 95,597, filed Dec. 7, 1970 and 95,680, filed Dec. 7, 1970 and now abandoned.

A function of a deviation of a reactor temperature from a predetermined temperature for adjusting the flow rate of the oxygen-containing gas in the line 10 may alternatively be generated as disclosed in U.S. patent application Ser. No. 95,597, entitled "FCC Catalyst Section Control," by Bernard C. Long, filed concurrently herewith and assigned to the assignee of the present application. Application Ser. No. 95,597 is incorporated herein by reference. Further, FIG. 7 of the present application corresponds to the figure of application Ser. No. 95,597. With reference to FIG. 7, there is provided a system wherein a signal representative of a reactor temperature is generated by a thermo-couple 51 and applied by a line 52 to a temperature controller 55. The controller 55 compares the reactor temperature signal to a predetermined reactor temperature as determined by a set point control 53, and applies a reactor temperature deviation signal to a line 45. The reactor temperature deviation signal adjusts the valve 12 in the vent line 11 to thereby adjust the flow rate of the oxygen-containing gas in the line 10 in a direction to reduce the reactor deviation signal.

Figure 8:
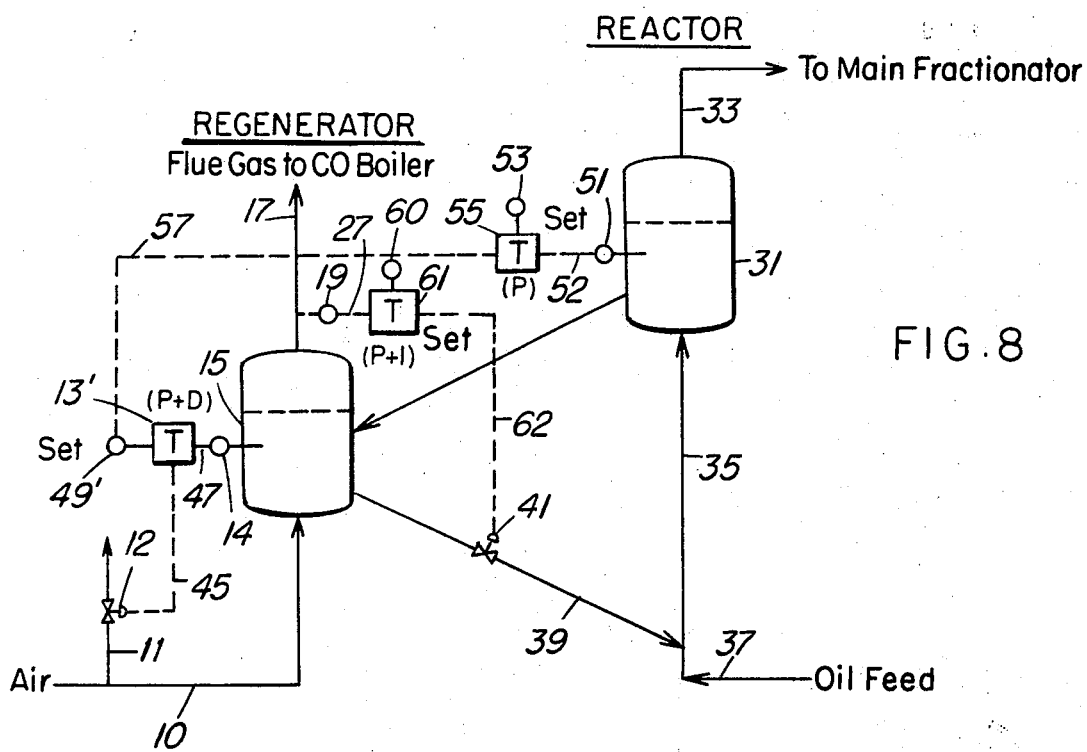

Further, the representation of a deviation of an amount of oxygen in the upper portion of the regenerator from a predetermined representation of an amount of oxygen may alternatively be generated as disclosed in U.S. patent application Ser. No. 95,597 and in U.S. application Ser. No. 95,680 entitled "FCC Catalyst Section Control," by Wooyoung Lee, Bernard C. Long and Vern W. Weekman, Jr., field concurrently herewith and assigned to the assignee of the present application. Application Ser. No. 95,680 is incorporated herein by reference. FIG. 8 corresponds to FIG. 2 of U.S. patent application Ser. No. 95,680. Each of FIGS. 7 and 8 show controlling the flow rate of the regenerated catalyst in the standpipe 39 in response to a flue gas temperature deviation signal applied from a temperature controller 61 along a line 62 to the valve 41. The controller 61 is responsive to a flue gas temperature signal generated by a thermo-couple 19 and predetermined flue gas temperature as reflected by the position of the set point control 60.

The term function, when used herein in the context of adjusting the flow rate of the oxygen-containing gas to the regenerator in response to a function of a reactor temperature deviation, means that the flow rate of the oxygen-containing gas is dependent on and varies with at least a reactor temperature deviation.

We claim:

1. In a method of controlling a fluid catalytic process for the conversion of a hydrocarbon feed stream, wherein said stream is contacted with an active catalyst in a reactor maintained under catalytic conversion conditions to provide reaction products which are removed from said reactor, the catalyst in said reactor becoming contaminated by the deposition of coke thereon, and wherein the contaminated catalyst is circulated from said reactor through a regenerator having a catalyst phase wherein said coke is burned with the evolution of a flue gas by contact with an oxygen-containing gas to thereby regenerate the catalyst and elevate the temperature of the regenerated catalyst before returning the regenerated catalyst to said reactor, the steps comprising:

comparing an actual regenerator catalyst temperature with a predetermined regenerator catalyst temperature to obtain a regenerator catalyst temperature deviation, adjusting the flow rate of the oxygen-containing gas to said regenerator in a direction to reduce said regenerator catalyst temperature deviation, comparing an actual reactor temperature with a predetermined reactor temperature to obtain a reactor temperature deviation, adjusting said predetermined regenerator catalyst temperature in response to said reactor temperature deviation in a direction to reduce said reactor temperature deviation, comparing a representation of an amount of oxygen in the upper portion of the regenerator with a predetermined representation of an amount of oxygen in the upper portion of the regenerator to provide a regenerator oxygen deviation, and controlling the flow rate of the regenerated catalyst to said reactor in a direction to reduce said oxygen deviation.

2. The process of claim 1, wherein said representation of an amount of oxygen in the upper portion of the regenerator is provided by measuring a temperature differential between the regenerator dense bed and the flue gas, and wherein said predetermined representation of oxygen in the upper portion of the regenerator is a predetermined temperature between the regenerator dense bed and the flue gas.

3. The process of claim 1 wherein said representation of an amount of oxygen in the upper portion of the regenerator is provided by measuring the amount of oxygen in the flue gas, and wherein said predetermined representation of oxygen in the upper portion of the regenerator is a predetermined flue gas oxygen level.

4. In a system for controlling a fluid catalytic process for the conversion of a hydrocarbon feed stream, wherein said stream is contacted with an active catalyst in a reactor maintained under catalytic conversion conditions to provide reaction products which are removed from said reactor, the catalyst in said reactor becoming contaminated by the deposition of coke thereon, and wherein the contaminated catalyst is circulated from said reactor through a regenerator having a catalyst phase wherein said coke is burned with the evolution of a flue gas by contact with an oxygen-containing gas to thereby regenerate the catalyst and elevate the temperature of the regenerated catalyst before returning the regenerated catalyst to said reactor, the combination comprising:

means for comparing an actual regenerator catalyst temperature with a predetermined regenerator catalyst temperature to obtain a regenerator catalyst temperature deviation, means for adjusting the flow rate of the oxygen-containing gas to said regenerator in a direction to reduce said regenerator catalyst temperature deviation, means for comparing an actual reactor temperature with a predetermined reactor temperature to obtain a reactor temperature deviation, means for adjusting said predetermined regenerator catalyst temperature in response to said reactor temperature deviation in a direction to reduce said reactor temperature deviation, means for comparing a representation of the amount of oxygen in the upper portion of the regenerator with a predetermined representation of the amount of oxygen in the upper portion of the regenerator to provide a regenerator oxygen deviation, and means for controlling the flow rate of the regenerated catalyst to said reactor in a direction to reduce said oxygen deviation.

5. The system of claim 4 wherein the representation of the amount of oxygen in the upper portion of the regenerator is provided by measuring a temperature differential between the regenerator dense bed and the flue gas, and wherein the predetermined representation of oxygen in the upper portion of the regenerator is a predetermined temperature between the regenerator dense bed and the flue gas.

6. The system of claim 4 wherein said representation of an amount of oxygen in the upper portion of the regenerator is provided by measuring the amount of oxygen in the flue gas, and wherein said predetermined representation of oxygen in the upper portion of the regenerator is a predetermined flue gas oxygen level.

7. The system of claim 4 wherein said oxygen-containing gas adjusting means has a gain adjustable to zero or to greater than zero.

8. In a system for controlling a fluid catalytic process for the conversion of a hydrocarbon feed stream, wherein said stream is contacted with an active catalyst in a reactor maintained under catalytic conversion conditions to provide reaction products which are removed from said reactor, the catalyst in said reactor becoming contaminated by the deposition of coke thereon, and wherein the contaminated catalyst is circulated from said reactor through a regenerator have a catalyst phase wherein said coke is burned with the evolution of a flue gas by contact with an oxygen-containing gas to thereby regenerate the catalyst and elevate the temperature of the regenerated catalyst before returning the regenerated catalyst to said reactor, the combination comprising:

means for generating a signal representative of an actual regenerator catalyst temperature, means for generating a signal representative of a predetermined regenerator catalyst temperature, means responsive to said actual regenerator catalyst temperature signal and said predetermined regenerator catalyst temperature signal for generating a signal representative of the deviation of said actual regenerator catalyst temperature signal from said predetermined regenerator catalyst temperature signal, means responsive to said regenerator catalyst temperature deviation signal for adjusting the flow rate of the oxygen-containing gas supplied to said regenerator in a direction to reduce said regenerator catalyst temperature deviation signal, means for generating a signal representative of an actual reactor temperature, means for generating a signal representative of a predetermined reactor temperature, means responsive to said actual reactor temperature signal and said predetermined reactor temperature signal for generating a signal representative of the deviation of said actual reactor temperature signal from said predetermined reactor temperature signal, means responsive to said reactor temperature deviation signal for adjusting said predetermined regenerator catalyst temperature signal generating means to modify said predetermined regenerator catalyst temperature signal in a direction to reduce said reactor temperature deviation signal, means for generating a signal representative of the actual amount of oxygen in the upper portion of the regenerator, means for generating a signal representative of a predetermined amount of oxygen in the upper portion of said regenerator, means responsive to said actual amount of oxygen signal and to said predetermined amount of oxygen signal for generating a signal representative of the deviation of said actual amount of oxygen signal from said predetermined amount of oxygen signal, and means responsive to said oxygen deviation signal for adjusting the flow rate of the regenerated catalyst to said reactor in a direction to reduce said oxygen deviation signal.

9. In a system for controlling a fluid catalytic process for the conversion of a hydrocarbon feed stream, wherein said stream is contacted with an active catalyst in a reactor maintained under catalytic conversion conditions to provide reaction products which are removed from said reactor, the catalyst in said reactor becoming contaminated by the deposition of coke thereon, and wherein the contaminated catalyst is circulated from said reactor through a regenerator having a dense bed phase at the lower portion thereof where said coke is burned with the evolution of a flue gas by contact with an oxygen-containing gas to thereby regenerate the catalyst and elevate the temperature of the regenerated catalyst before returning the regenerated catalyst to said reactor, the combination comprising:

means for generating a signal representative of an actual regenerator dense bed temperature, means for generating a signal representative of a predetermined regenerator dense bed temperature, means responsive to said actual regenerator dense bed temperature signal and said predetermined regenerator dense bed temperature signal for generating a signal representative of the deviation of said actual generator dense bed temperature signal from said predetermined regenerator dense bed temperature signal, means responsive to said regenerator dense bed temperature deviation signal for adjusting the flow rate of the oxygen-containing gas supplied to said regenerator in a direction to reduce said regenerator dense bed temperature deviation signal, means for generating a signal representative of an actual reactor temperature, means for generating a signal representative of a predetermined reactor temperature, means responsive to said actual reactor temperature signal and said predetermined reactor temperature signal for generating a signal representative of the deviation of said actual reactor temperature signal from said predetermined reactor temperature signal, means responsive to said reactor temperature deviation signal for adjusting said predetermined regenerator dense bed temperature signal generating means to modify said predetermined regenerator dense bed temperature signal in a direction to reduce said reactor temperature deviation signal, means for generating a signal representative of an actual temperature differential between an actual regenerator dense bed temperature and an actual flue gas temperature, means for generating a predetermined temperature differential between the regenerator dense bed and the flue gas, means responsive to said actual temperature differential signal and said predetermined temperature differential signal for generating a signal representative of the deviation of said actual temperature differential signal from said predetermined temperature differential signal, and means responsive to said temperature differential deviation signal for adjusting the flow rate of the regenerated catalyst to said reactor in a direction to reduce said temperature differential deviation signal.

References Cited
UNITED STATES PATENTS

| | | | |
|---|---|---|---|
| 3,591,783 | 7/1971 | Zumwalt | 208—164 |
| 3,412,014 | 11/1968 | Mattix et al. | 208—164 |
| 3,004,926 | 10/1961 | Goering | 252—417 |
| 3,166,381 | 1/1965 | Loss | 23—288 S |
| 2,963,422 | 12/1960 | Hann | 208—160 |
| 3,175,968 | 3/1965 | Berger | 208—164 |
| 3,261,777 | 7/1966 | Iscol et al. | 208—113 |
| 3,410,793 | 11/1968 | Stranahan et al. | 208—159 |
| 3,513,087 | 5/1970 | Smith | 208—159 |

HERBERT LEVINE, Primary Examiner

U.S. Cl. X.R.

208—DIG. 1; 23—288 S